(12) United States Patent
Nakagawa et al.

(10) Patent No.: US 7,267,634 B2
(45) Date of Patent: Sep. 11, 2007

(54) DRIVE DEVICE FOR WORKING VEHICLE AND METHOD OF CONTROLLING THE DRIVE OF WORKING VEHICLE

(75) Inventors: Tomohiro Nakagawa, Osaka (JP); Shigeru Yamamoto, Osaka (JP); Shunji Oka, Ishikawa (JP); Toshikazu Okada, Osaka (JP)

(73) Assignee: Komatsu Ltd., Tokyo (JP)

( * ) Notice: Subject to any disclaimer, the term of this patent is extended or adjusted under 35 U.S.C. 154(b) by 203 days.

(21) Appl. No.: 11/100,402

(22) Filed: Apr. 7, 2005

(65) Prior Publication Data

US 2005/0227810 A1 Oct. 13, 2005

(30) Foreign Application Priority Data

Apr. 8, 2004 (JP) .............................. 2004-114082
Apr. 6, 2005 (JP) .............................. 2005-109817

(51) Int. Cl.
*B60W 10/02* (2006.01)
*B60W 10/04* (2006.01)

(52) U.S. Cl. .......................... 477/175; 477/74; 477/77; 477/92; 477/172; 477/174

(58) Field of Classification Search .................... 477/1, 477/71, 73, 74, 75, 77, 92, 172, 173, 174, 477/175
See application file for complete search history.

(56) References Cited

U.S. PATENT DOCUMENTS 4,768,636 A * 9/1988 Ito et al. ........................ 477/71
5,588,515 A * 12/1996 Toyama et al. ............. 192/222
5,699,248 A * 12/1997 Nakagami et al. ............ 701/50
2004/0180753 A1* 9/2004 Takamura et al. ............ 477/94

FOREIGN PATENT DOCUMENTS

JP 6-272758 9/1994
JP 9-88653 3/1997

* cited by examiner

*Primary Examiner*—David D. Le
(74) *Attorney, Agent, or Firm*—Wenderoth, Lind & Ponack, L.L.P.

(57) ABSTRACT

The present invention provides a drive device for a working vehicle whereby gear change shock during the forward/reverse running changeover action can be reduced while achieving shortening of cycle time and protecting various clutch mechanisms in the transmission. If a reverse running command is output from a running control device while the vehicle is running forward, an ECMV controls a braking force of a brake device so as to reduce a vehicle speed through a first prescribed speed to a second prescribed speed, and disengages the forward clutch. When the vehicle speed reaches the first prescribed speed, the ECMV puts the reverse clutch in a slipping action condition and, after the vehicle speed reaches the second prescribed speed, gradually engages the reverse clutch.

14 Claims, 3 Drawing Sheets

DRIVE DEVICE FOR WORKING VEHICLE AND METHOD OF CONTROLLING THE DRIVE OF WORKING VEHICLE

BACKGROUND OF THE INVENTION

1. Field of the Invention

The present invention relates to a drive device suitable for mounting in a working vehicle such as for example a bulldozer and a drive method thereof 2. Description of the Related Art A conventional drive device comprises an engine, transmission and drive wheel (sprocket wheel). The transmission comprises a forward running stage that is selected by engagement of a forward clutch, a reverse running stage that is selected by engagement of a reverse clutch and speed stages that are selected by a speed-stage changeover clutch.

In this drive device, when the operator operates the running control device to output a forward running command, this forward running command causes the forward clutch to be engaged so that the motive power of the engine is transmitted to the drive wheels through the forward running stage and the currently selected speed stage of the transmission. As a result, the vehicle runs in the forward direction. Also, in this drive device, when the operator operates the running control device to output a reverse running command, this reverse running command causes the reverse clutch to be engaged so that the motive power of the engine is transmitted to the drive wheel through the reverse running stage and the currently selected speed stage of the transmission. As a result, the vehicle runs in the reverse direction.

Typically, when forward/reverse running action of the vehicle is changed over, changeover of forward/reverse running action is preferably performed by the running control device after temporarily stopping the vehicle, in order to protect the device.

However, in order to shorten the cycle time, the actual situation is that a reverse running command is output by operating the running control device for example in a condition with the vehicle running forward.

In the drive device, if the operator causes a reverse running command to be output by operating the running control device while the vehicle is running in the forward direction, the reverse clutch is gradually brought into engagement. In this way, the kinetic energy of the vehicle is absorbed by the reverse clutch and the vehicle is decelerated.

For example Japanese Patent Application Laid-open No. 6-272758 discloses a drive device wherein, in the event of changeover between forward and reverse running, control is exercised so as to decelerate the vehicle by absorbing the kinetic energy of the vehicle by means of the speed stage changeover clutch, by putting both the forward clutch and reverse clutch in disengaged condition and suitably engaging the speed stage changeover clutch.

Using an action of engaging the reverse clutch to decelerate the vehicle during forward running as in conventional drive devices is subject to the following problems.

(A) When the reverse clutch is put into a slipping action condition, motive power so as to cause the vehicle to run in the reverse direction is instantaneously transmitted from the transmission to the drive wheel. This therefore gives rise to a gear change shock.

(B) In order to decelerate the vehicle, the reverse clutch is subjected to a large heat load. The life of the reverse clutch is thereby lowered. Consideration has been given to performing the action of engaging the reverse clutch for a short time, in order to suppress the heat load to which the reverse clutch is subjected, but, if this is done, rapid deceleration of the vehicle generates a large gear change shock.

(C) In order to suppress the application of further heat load to the reverse clutch after this clutch has received a large heat load during vehicle deceleration, it is necessary to perform an action of engaging the reverse clutch for a short time when the vehicle is made to form reverse running after deceleration. Such an engagement action of course gives rise to gear change shock.

Problems similar to the above problems also arise in the case of changing over to forward running of the vehicle during reverse running.

Also, although, in the case of the drive device of Laid-open Japanese Patent Application Laid-open No. 6-272758, both the forward clutch and the reverse clutch are put in disengaged condition when changeover of the forward/reverse running is performed, so that there is no possibility of instantaneous drive force such as would advance the vehicle in the direction opposite to its current direction of running being applied from the transmission to the drive wheel, so a gear change shock as described under (A) cannot be produced, the speed stage changeover clutch is subjected to a large heat load during vehicle deceleration. As a result, there is the problem that the life of the speed stage changeover clutch is decreased.

SUMMARY OF THE INVENTION

The present invention was made in view of the above, its object being to provide a drive device for a working vehicle whereby a shortening of cycle time can be achieved and gear change shock during the forward/reverse running changeover action can be reduced while protecting the various clutch mechanisms in the transmission.

According to a first aspect of the present invention, there is provided a drive device for a working vehicle having a transmission comprising a forward running stage that is selected by engagement of a forward clutch and a reverse running stage that is selected by engagement of a reverse clutch, in which a motive power of an engine is transmitted to a drive wheel through the selected forward running stage or reverse running stage, the drive device comprising:

control means that outputs a reverse running command in accordance with operation of a control unit;

brake means that decreases a vehicle speed;

braking force control means that controls a braking force of the brake means; and forward/reverse clutch control means that controls respective engagement/disengagement actions of the forward clutch and reverse clutch; wherein if the reverse running command is output from the control means while the vehicle is running forward, the braking force control means controls the braking force of the brake means such that the vehicle speed is diminished through a first prescribed speed to a second prescribed speed and the forward/reverse clutch control means disengages the forward clutch, when the vehicle speed has reached the first prescribed speed, the reverse clutch is put in a slipping action condition, and after the vehicle speed has reached the second prescribed speed, the reverse clutch is gradually engaged.

According to a second aspect of the present invention, there is provided a drive device for a working vehicle having a transmission comprising a forward running stage that is selected by engagement of a forward clutch and a reverse running stage that is selected by engagement of a reverse clutch, in which a motive power of an engine is transmitted to a drive wheel through the selected forward running stage or reverse running stage, the drive device comprising:

control means that outputs a forward running command in accordance with operation of a control unit;

brake means that decreases a vehicle speed;

braking force control means that controls a braking force of the brake means; and forward/reverse clutch control means that controls respective engagement/disengagement actions of the forward clutch and reverse clutch; wherein if the forward running command is output from the control means while the vehicle is running in reverse, the braking force control means controls the braking force of the brake means such that the vehicle speed is diminished through a first prescribed speed to a second prescribed speed and the forward/reverse clutch control means disengages the reverse clutch, when the vehicle speed has reached the first prescribed speed, the forward clutch is put in a slipping action condition, and after the vehicle speed has reached the second prescribed speed, the forward clutch is gradually engaged.

According to a third aspect of the present invention, in the first aspect of the present invention, the braking force control unit performs control so as to increase the braking force of the brake unit in stepwise fashion or in accordance with the vehicle speed.

According to a fourth aspect of the present invention, in the second aspect of the present invention, the braking force control unit performs control so as to increase the braking force of the brake unit in stepwise fashion or in accordance with the vehicle speed.

According to a fifth aspect of the present invention, in the first aspect of the present invention, an engine control unit is provided that controls the engine and this engine control unit performs control to temporarily decrease the engine rotational speed prior to commencement of the gradual engagement action of the reverse clutch and to increase the engine rotational speed that is temporarily decreased after completion of engagement of the reverse clutch.

According to a sixth aspect of the present invention, in the second aspect of the present invention, an engine control unit is provided that controls the engine and this engine control unit performs control to temporarily decrease the engine rotational speed prior to commencement of the gradual engagement action of the forward clutch and to increase the engine rotational speed that is temporarily decreased after completion of engagement of the forward clutch.

According to a seventh aspect of the present invention, in the first aspect of the present invention, a torque converter comprising a lock-up clutch is interposed in a motive power transmission path between the engine and the transmission and a lock-up clutch control unit is provided that controls the engagement/disengagement action of the lock-up clutch; and the lock-up clutch control unit performs control so as to disengage the lock-up clutch in accordance with disengagement of the forward clutch and to gradually engage the lock-up clutch after completion of engagement of the reverse clutch.

According to an eighth aspect of the present invention, in the second aspect of the present invention, a torque converter comprising a lock-up clutch is interposed in a motive power transmission path between the engine and the transmission and a lock-up clutch control unit is provided that controls the engagement/disengagement action of the lock-up clutch; and the lock-up clutch control unit performs control so as to disengage the lock-up clutch in accordance with disengagement of the reverse clutch and to gradually engage the lock-up clutch after completion of engagement of the forward clutch.

According to a ninth aspect of the present invention, there is provided a method of controlling drive of a working vehicle having a transmission comprising a forward running stage that is selected by engagement of a forward clutch and a reverse running stage that is selected by engagement of a reverse clutch, in which a motive power of an engine is transmitted to a drive wheel through the selected forward running stage or reverse running stage, the method comprising the steps of:

if a reverse running command is output while the vehicle is running forward, controlling a braking force of a brake so as to decrease a vehicle speed through a first prescribed speed to a second prescribed speed;

disengaging the forward clutch, putting the reverse clutch in a slipping action condition when the vehicle speed has reached the first prescribed speed; and gradually engaging the reverse clutch after the vehicle speed has reached the second prescribed speed.

According to a tenth aspect of the present invention, there is provided a method of controlling drive of a working vehicle having a transmission comprising a forward running stage that is selected by engagement of a forward clutch and a reverse running stage that is selected by engagement of a reverse clutch, in which a motive power of an engine is transmitted to a drive wheel through the selected forward running stage or reverse running stage, the method comprising the steps of:

if a forward running command is output while the vehicle is running in reverse, controlling a braking force of a brake so as to decrease a vehicle speed through a first prescribed speed to a second prescribed speed;

disengaging the reverse clutch, putting the forward clutch in a slipping action condition when the vehicle speed has reached the first prescribed speed; and gradually engaging the forward clutch after the vehicle speed has reached the second prescribed speed.

With the first aspect of the present invention (third aspect, fifth aspect and seventh aspect of the present invention), when a reverse running command is output from the control section while the vehicle is running forward, the vehicle speed is decreased by the brake unit through a first prescribed speed to a second prescribed speed. Furthermore, when a reverse running command is output from the control section while the vehicle is running forward, the forward clutch is disengaged. When the vehicle speed has reached the first prescribed speed, the reverse clutch is put in a slipping action condition. Furthermore, after the vehicle speed has reached the second prescribed speed, the reverse clutch is gradually engaged. The first prescribed speed may be for example the speed at which the operator feels no gear change shock even when the clutch mechanism (reverse clutch) corresponding to the running stage (reverse running stage) whereby the vehicle is made to proceed in the opposite direction to the current running direction (forward running direction) is put into a slipping action condition i.e. a condition in which the working surfaces of the clutch are in a slipping condition. Also, the second prescribed speed is set for example at a speed close to the vehicle speed zero.

The second aspect of the present invention (fourth aspect, sixth aspect, eighth aspect of the present invention) are inventions that relate to control when "forward running" in the first aspect of the present invention (third aspect, fifth aspect, and seventh aspect of present invention) is substituted by "reverse running" and "reverse running" is substituted by "forward running" i.e. inventions in which a changeover is effected from reverse running to forward running.

The ninth aspect of the present invention is an aspect of the present invention in which the device invention of the first invention is replaced by a method invention. The tenth aspect of the present invention is an aspect of the present invention in which the device invention of the second invention is replaced by a method invention.

According to the first aspect of the present invention and the ninth aspect of the present invention, most of the kinetic energy of the vehicle is absorbed by the brake unit, reducing the vehicle speed with a smooth action and rapidly, and considerably decreasing the heat load to which the reverse clutch is subjected. Also, since the heat load to which the reverse clutch is subjected is considerably decreased, the need to perform the engagement action of the reverse clutch in a short time, as was necessary conventionally, when causing the vehicle to run in reverse after the speed reduction action, is eliminated. It is thereby possible to engage the reverse clutch gradually so that the operator does not feel a gear change shock.

With the present invention, a shortening of cycle time can be achieved and gear change shock during the forward/reverse running changeover action can be reduced while protecting the various clutch mechanisms in the transmission. the same effect can be obtained in the case of both the second aspect of the present invention and the tenth aspect of the present invention.

With the third aspect of the present invention and the fourth aspect of the present invention, generation of gear change shock when braking force is applied to the vehicle can be reliably prevented.

With the fifth aspect of the present invention, the engine rotational speed is temporarily reduced prior to commencement of the gradual engagement action of the reverse clutch, so gear change shock on commencement of the gradual engagement action of the reverse clutch can be further reduced. Also, since the engine rotational speed that had been temporarily decreased is increased after completion of the engagement action of the reverse clutch, the vehicle speed can be smoothly accelerated after the forward/reverse running changeover action. The same effect is obtained in the case of the sixth aspect of the present invention.

With the seventh and eighth aspect of the present invention, a lock-up clutch is disengaged during the forward/reverse running changeover action, so that the mechanical motive power of the engine is temporarily converted into dynamic energy of fluid in the torque converter before being again converted into mechanical motive power which is input to the transmission. In this way, gear change shock during the forward/reverse running changeover action is further reduced by the damping effect produced by the torque converter. Also, an improvement in the efficiency of transmission of motive power is achieved by direct input of the mechanical motive power of the engine to the transmission by putting the lock-up clutch in an engaged condition before and after the forward/reverse running changeover action. Thus it is arranged to perform the lock-up clutch engagement action in a gradual manner after the forward/reverse running changeover action, so there is no possibility of gear change shock being generated.

DETAILED DESCRIPTION OF THE INVENTION

Specific embodiments of a drive device for a working vehicle according to the present invention are described below with reference to the drawings. These embodiments are examples of the application of the present invention to a working vehicle typified by a bulldozer.

Figure 1:
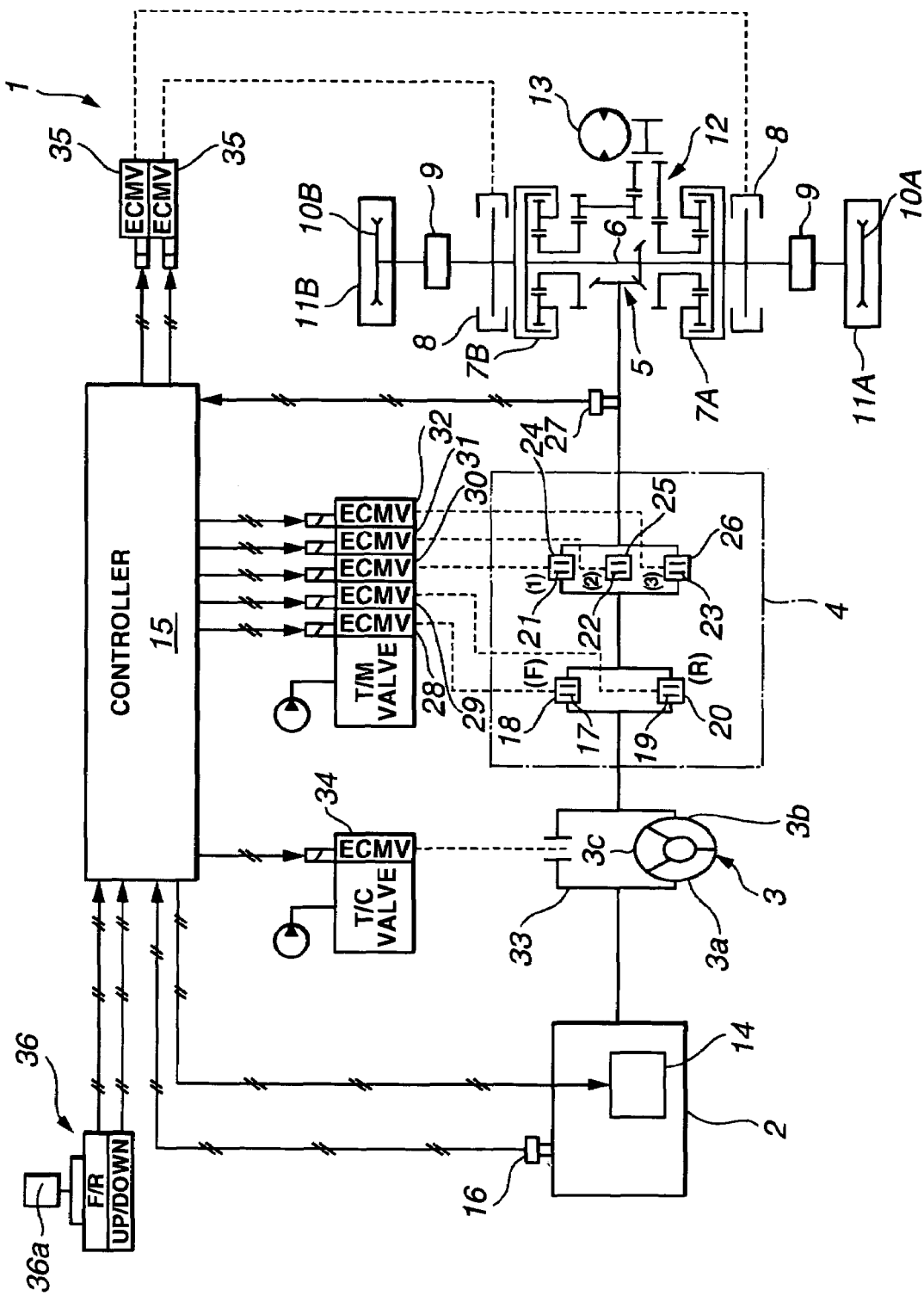
FIG. 1 is a diagrammatic view of the system layout of a bulldozer drive device according to an embodiment of the present invention.

FIG. 1 is a diagrammatic view of the system layout of a bulldozer drive device according to an embodiment of the present invention.

In the drive device 1 shown in FIG. 1, rotational motive power from the engine 2 is transmitted to a torque converter 3, is transmitted from the output shaft of this torque converter 3 to a transmission 4, and is transmitted from the output shaft of this transmission 4 to a horizontal shaft 6 through a bevel gear 5.

Left and right planetary gear mechanisms 7A, 7B are respectively linked with the horizontal shaft 6.

An output shaft that is fixed to a planetary carrier of the left planetary gear wheel mechanism 7A is linked with a left sprocket wheel (left drive wheel) 10A through a brake device 8 and final reduction gear 9. An output shaft that is fixed to a planetary carrier of the right planetary gear wheel mechanism 7B is linked with a right sprocket wheel (right drive wheel) 10B through a brake device 8 and final reduction gear 9. Also, the left and right sprocket wheels 10A, 10B respectively mesh with tracks 11A, 11B arranged on the left and right side sections of the vehicle body.

The rotational drive force that is transmitted from the horizontal shaft 6 to the respective ring gears in the left and right planetary gearwheel mechanisms 7A, 7B is transmitted to the sprocket wheels 10A, 10B through the final reduction gears 9, 9 from the respective planetary carriers in the left and right planetary gearwheel mechanisms 7A, 7B, so that the tracks 11A, 11B are driven by the sprocket wheels 10A, 10B.

The gears that are fixed integrally to the sun gear of the left planetary gear wheel mechanism 7A and the gears that are fixed integrally to the sun gear of the right planetary gearwheel mechanism 7B are meshed with gears that are fixed to the output shaft of a hydraulic motor 13 through a motive power transmission mechanism 12 comprising respectively required gearwheel trains. The rotational drive force of the hydraulic motor 13 is transmitted from the respective sun gears in the left and right planetary gearwheel mechanisms 7A, 7B to the left and right sprocket wheels 10A, 10B through the planetary gears and the final reduction gears 9, 9. The vehicle is swiveled to left or right by making the rotational speeds of the left and right sprocket wheels 10A, 10B different. This mechanism is termed a hydrostatic steering system (HSS).

The engine 2 is a diesel engine. A common rail type fuel injection device 14 is fitted in the engine 2. Such a fuel injection device 14 is in itself known. Specifically, the common rail fuel injection device 14 is an injection device of a type in which fuel is accumulated under pressure in a common rail chamber by means of a fuel pressure feed pump and injected from an injector by opening/closing of an electromagnetic valve. The fuel injection characteristic is determined by means of a drive signal that is supplied from a controller 15 to the electromagnetic valve. In this way, any desired injection characteristic from the low-speed range to the high-speed region of the engine 2 can be obtained.

In this embodiment, an electronically controlled injection system is constituted by the devices including the fuel injection device 14, the controller 15 and the various sensors. In such an electronic controlled injection system, an engine characteristic as will be described is obtained by using digital values to map the target injection characteristic. The actual rotational speed of the engine 2 is detected by a rotational speed sensor 16 and this detection signal is input to the controller 15.

The transmission 4 comprises a forward running stage 18 that is selected by engagement of a forward clutch 17 and a reverse running stage 20 that is selected by engagement of a reverse clutch 19, and first to third speed stages 24 to 26 that are selected by means of speed stage changeover clutches 21 to 23. The forward clutch 17, reverse clutch 19 and speed stage changeover clutches 21 to 23 are respectively constituted by hydraulically actuated friction clutches. Also, the forward running stage 18, reverse running stage 20 and first to third speed stages 24 to 26 are respectively formed by planetary gearwheel trains (or parallel shaft gearwheel trains). Also, the rotational speed of the output shaft of this transmission 4 is detected by a rotational speed sensor 27 and this detection signal is input to the controller 15. The controller 15 converts the rotational speed of the output shaft of the transmission 4 that is input thereto to vehicle speed.

The transmission 4 is fitted with an ECMV (Electric Control Modulation Valve) 28 that controls the engagement/disengagement action of the forward clutch 17.

The ECMV 28 is chiefly constituted by a combination of a flow rate detection valve and an electromagnetic proportional pressure control valve. When the ECMV 28 inputs the trigger current that is output from the controller 15, it starts to fill the forward clutch 17 with hydraulic fluid. So long as the ECMV 28 allows flow of hydraulic fluid to the forward clutch 17, this forward clutch 17 is rapidly filled with hydraulic fluid. When the forward clutch 17 is full of hydraulic fluid, the hydraulic fluid pressure that acts on the forward clutch 17 is changed in accordance with a command current from the controller 15.

In this transmission 4, the reverse clutch 19 and the speed stage changeover clutches 21 to 23 are likewise respectively fitted with corresponding ECMVs 29 to 32.

The torque converter 3 comprises a lock-up clutch 33. When the characteristic of the torque converter is not required, this lock-up clutch 33 links the pump (input element) 3a and turbine (output element) 3b in fixed fashion.

When a command current is input to the ECMV 34 from the controller 15, the ECMV 34 controls the engagement/disengagement action of the lock-up clutch 33 by changing the hydraulic pressure acting on the lock-up clutch 33 in accordance with the command current. Thereupon, if the lock-up clutch 33 has been put in disengaged condition by the ECMV 34, the mechanical motive power of the engine 2 is temporarily converted to kinetic energy of the fluid in the torque converter 3 and is then again converted to mechanical motive power that is input to the transmission 4. In this way, vibration and/or shock generated in the motive power transmission path downstream of the engine 2 and/or transmission 4 are reduced by the damping effect produced by the torque converter 3. Also, if the lock-up clutch 33 has been put in engaged condition by the ECMV 34, the mechanical motive power from the engine 2 is directly input to the transmission 4 so that the motive power of the engine 2 is transmitted with high efficiency to the motive power transmission path downstream of the engine 2. It should be noted that, if the lock-up clutch 33 is in engaged condition, circulating flow of the working fluid in the torque converter 3 disappears, and shearing resistance of the fluid is generated with respect to the stator (reaction element) 3c, so, when the lock-up clutch 33 is in the engaged condition, the stator clutch, not shown, is released, freeing the stator 3c.

The brake device 8 comprises a brake force generating mechanism that converts the elastic force of a spring to braking force of the vehicle and a hydraulic actuator unit that outputs a force resisting this braking force, on being supplied with hydraulic fluid.

The ECMV 35 inputs a command current from the controller 15 and the ECMV 35 converts this command current to hydraulic pressure that acts on the hydraulic actuator unit of the brake device 8, thereby controlling the braking force of the brake device 8. For example, assuming that the braking force is zero when the hydraulic pressure (this pressure will be referred to as the "brake pressure" hereinbelow) acting on the hydraulic actuator unit of the brake device 8 from the ECMV 3 is Pa, when the brake pressure is decreased in stepwise fashion from Pa through Pb to Pc, the braking force is increased in stepwise fashion (see (g) of FIG. 3) from zero through Fb to Fc. Also, in for example a case where the brake pressure is decreased continuously (in step-less fashion) from Pb to Pc, the braking force is increased continuously from Fb to Fc (see (g') of FIG. 3).

In the driver's cab, not shown, a running control device 36 that controls the running action of the vehicle is provided. This running control device 36 comprises a running control lever 36a and a speed stage changeover switch (not shown) attached to the running control lever 36a. When the running control lever 36a is operated, a forward running command signal or reverse running command signal is output in accordance with the manner of operation. A speed stage changeover command signal is output when the speed stage changeover switch is operated.

The forward running command signal, reverse running command signal and speed stage changeover command signal that are output from the running control device 36 are respectively input to the controller 15.

The controller 15 comprises an input interface that converts and shapes the various input signals, a computer unit that performs arithmetical calculations or logical calculations on the input data in accordance with a determined procedure, an output interface that converts the result to an actuator operation signal and a memory that stores data or programs. For example a CPU in the computer unit of the controller 15 performs calculation processing of the current vehicle speed using a transmission output shaft rotation speed signal that is input to the input interface from a rotation speed sensor 27. Also, the memory of the controller 15 stores for example an operating program corresponding to control logic indicated in the flowchart of FIG. 2 and in the time chart of FIG. 3, to be described, reference values of the calculation result and a fuel injection characteristic map. Also, in the output interface of the controller 15, there are provided ECMV drive circuits, corresponding to the ECMVs 28 to 32, 34, 35, 35, that amplify the power of the minute signals from the computer unit and supply corresponding power to the ECMVs and there is provided a fuel injection device drive circuit that supplies power to an actuator (electromagnetic valve) of the fuel injection device 14 by amplifying the power of a minute signal from the computer unit.

Figure 2:
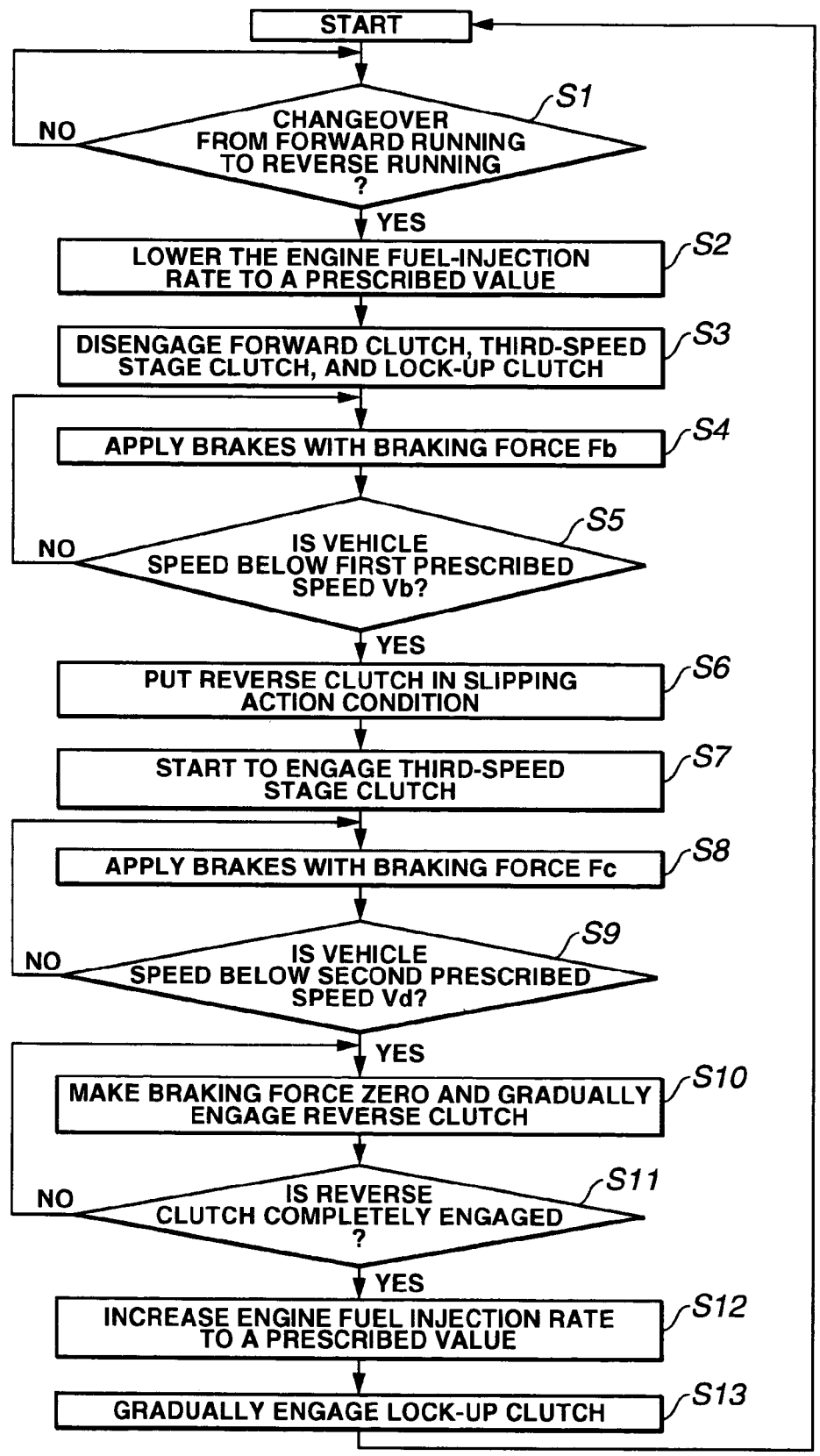
FIG. 2 is a flow chart showing the details of control of the changeover action from forward third gear to reverse third gear.

The action of the drive devices according to this embodiment constructed as above is described below with reference respectively to the flowchart of FIG. 2 and the time chart of FIG. 3. The operation description given below represents an example of changeover from forward running third gear to reverse running third gear. Also, in FIG. 2, the symbol "S" represents the steps of the flowchart.

S1 to S3:

When the operator operates the running control lever 36a at the time point t1 during forward running of the vehicle, a reverse running command signal is output from the running control device 36 (S1).

Figure 3:
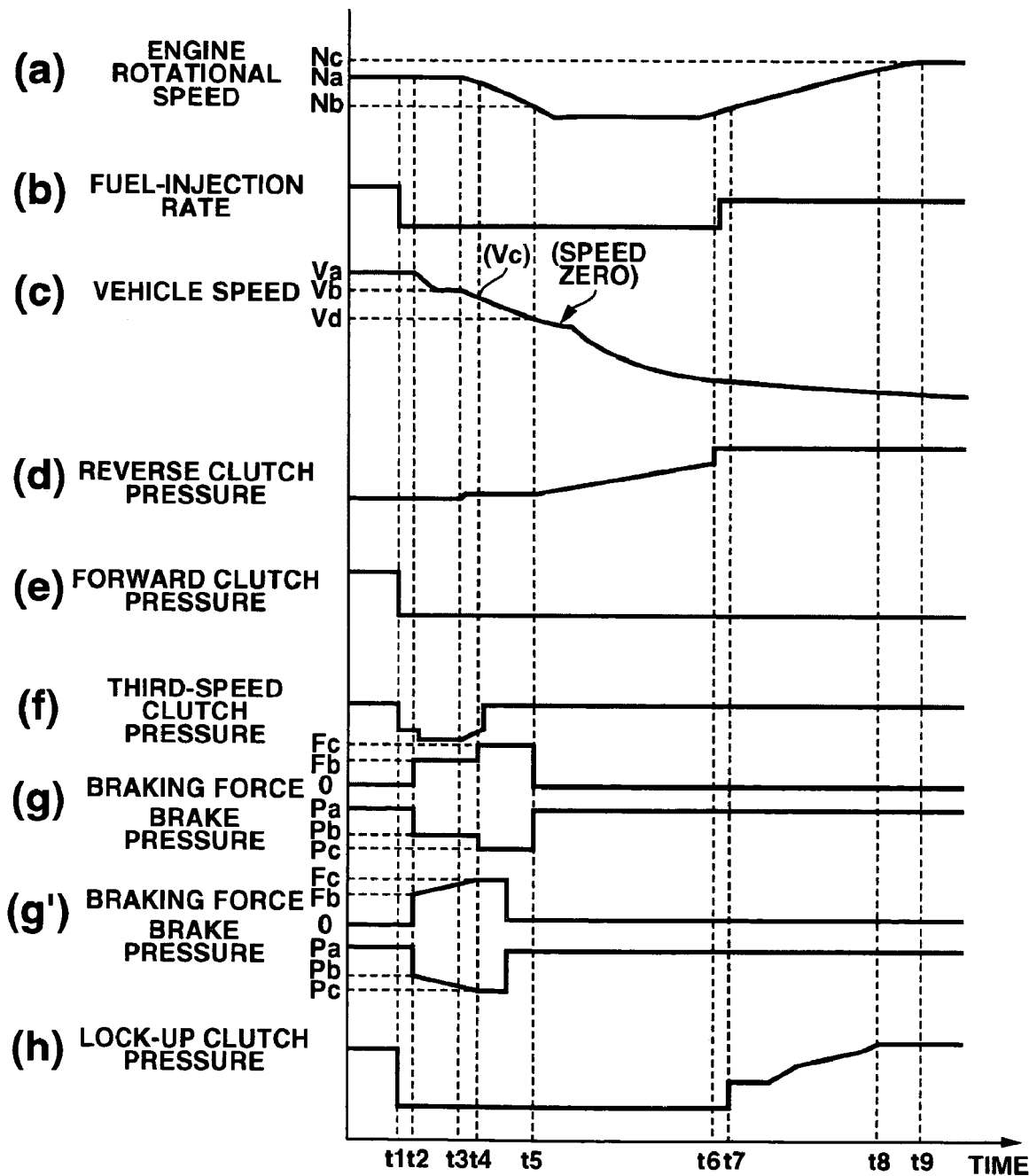
FIG. 3 is a time chart showing the details of control of the changeover action from forward third gear to reverse third gear.

With changeover from forward running to reverse running, the fuel-injection device 14 reduces the fuel injection rate to a prescribed value (see (b) of FIG. 3). As a result, the engine rotational speed is subsequently gradually decreased from the current engine rotational speed Na until, at the time point t5, an engine rotational speed Nb that is lower by a prescribed rotational speed than the current engine rotational speed Na is reached (see (a) of FIG. 3; S2).

Also, at the time point t1, the ECMV 28 corresponding to the forward clutch 17 drains the hydraulic pressure acting on the forward clutch 17, thereby disengaging the forward clutch 17 (see (e) of FIG. 3). Also, at the time point t1, the ECMV 32 corresponding to the third-speed stage clutch 23 drains the hydraulic fluid acting on the third-speed stage clutch 23, thereby disengaging the third-speed stage clutch 23 (see (f) of FIG. 3). Also, at the time point t1, the ECMV 34 corresponding to the lock-up clutch 33 drains the hydraulic fluid acting on the lock-up clutch 33, thereby disengaging the lock-up clutch 33 (see (h) of FIG. 3). In this way, transmission of motive power from the engine 2 to the transmission 4 is disengaged and transmission of motive power from the engine 2 to the transmission 4 is changed from a condition of transmission of motive power mechanically to a condition of transmission of motive power through fluid using the torque converter 3 (S3).

S4 to S7:

The ECMVs 35, 35 corresponding to the brake devices 8, 8 change the brake pressure from the current brake pressure Pa to a brake pressure Pb that is lowered by one step, at the time point t2 where motive power transmitted to the forward running stage 18 and the third-speed stage 26 has been completely disengaged. This brake pressure Pb is a brake pressure at which braking force Fb is obtained so as to reduce the speed of the vehicle from the vehicle speed Va at the time point t2 to a first prescribed speed Vb at the time point t3 (see (c) and (g) of FIG. 3; S4).

At the time point t3, when the vehicle speed falls below the first prescribed speed Vb (S5; see (c) of FIG. 3), the ECMV 29 corresponding to the reverse clutch 19 puts the reverse clutch 19 in a slipping action condition (S6; see (d) of FIG. 3), and the ECMV 32 corresponding to the third-speed stage clutch 23 starts to gradually increase the hydraulic pressure acting on the third-speed stage clutch 23 and starts to engage the third-speed stage clutch 23 (S7; see (f) of FIG. 3). After the ECMV 32 has gradually increased the hydraulic pressure acting on the third-speed stage clutch 23, this hydraulic pressure abruptly rises, fully engaging the third-speed stage clutch 23 (see (f) of FIG. 3). It should be noted that the reverse clutch pressure in the slipping action condition of the reverse clutch 19 is extremely small and in order to clearly show the change of pressure in FIG. 3 is shown diagrammatically, with the scale of the reverse clutch pressure during the time from time point t3 to t5 reduced.

The first prescribed speed Vb is a speed at which the operator does not feel a gear change shock even when the clutch (reverse clutch 19) corresponding to the running stage (reverse running stage 20) that would make the vehicle run in the opposite direction to the current running direction (forward running direction) is put in the engagement standby condition (slipping engagement condition) and is a speed that is found empirically.

S8 to S10:

The ECMVs 35, 35 corresponding to the brake devices 8, 8 change the brake pressure from the current brake pressure Pb to a brake pressure Pc reduced by one step at the time point t4 where the vehicle speed has changed to a speed Vc that is reduced from the first prescribed speed Vb. This brake pressure Pc is a brake pressure whereby a braking force Fc is obtained so as to reduce the vehicle speed from the vehicle speed Vc at the time point t4 to a prescribed second speed Vd at the time point t5. The brake pressure Pc acts during the period of the time points t4 to t5 (see (c) and (g) of FIG. 3; S8).

At the time point t5, when the vehicle speed falls below the second prescribed speed Vd (S9; see (c) of FIG. 3), the ECMVs 35, 35 reduce the brake pressure to Pa, making the braking force F become zero (see (g) of FIG. 3) and the ECMV 29 corresponding to the reverse clutch 19 commences gradual increase in the hydraulic pressure acting on the reverse clutch 19 from the time point t5; by gradually increase in the hydraulic pressure acting on the reverse clutch 19 during the period of the time points t5 to t6, the reverse clutch 19 is gradually engaged (S10; see (d) of FIG. 3). In this process, the gradual engagement action of the reverse clutch 19 is performed in accordance with an engagement pattern whereby little gear change shock is produced.

The second prescribed speed Vd is set as a speed close to vehicle speed zero.

S11 to S13:

At the time point t6, when the reverse clutch 19 has been fully engaged (see (d) of FIG. 3; S11), the fuel injection device 14 immediately increases the fuel ignition rate to a prescribed value (see (b) of FIG. 3). The current engine rotational speed, which is lower than the engine rotational speed Nb at the time point t5, is therefore subsequently gradually increased and, at the time point t9, reaches the engine rotational speed Nc, which is higher by a prescribed rotational speed than the current engine rotational speed (see (a) of FIG. 3; S12).

Also, from the time point t7 after the time point t6 at which the reverse clutch 19 is fully engaged, the ECMV 34 corresponding to the lock-up clutch 33 gradually increases the hydraulic pressure acting on the lock-up clutch 33, thereby gradually engaging the lock-up clutch 33 during the period of the time points t7 to t8, until at the time point t8 the lock-up clutch 33 is fully engaged (S13; see (h) of FIG. 3). With this embodiment, the following effects are obtained.

(1) Since most of the kinetic energy of the vehicle during deceleration is absorbed by the brake devices 8, 8, the heat load experienced by the reverse clutch 19 is considerably diminished, thereby enabling the shortening of the life of the reverse clutch 19 to be suppressed.

(2) Since the vehicle speed is reduced with a smooth action and rapidly by increasing the braking force of the braking devices 8, 8 in stepwise fashion, the cycle time can be reduced without accompanying gear change shock.

(3) Since the heat load to which the reverse clutch 19 is subjected is considerably decreased, it becomes possible to engage the reverse clutch 19 gradually so that the operator does not experience gear change shock; thus the transition to reverse running operation can be achieved with a smooth action.

(4) Since the engine rotational speed is reduced temporarily from Na to Nb until the time point t5 at which gradual engagement action of the reverse clutch 19 is commenced, the gear change shock that occurs when the gradual engagement action of the reverse clutch 19 is commenced can be further reduced.

(5) Since the engine rotational speed that is temporarily reduced accompanying the commencement of the gradual engagement action of the reverse clutch 19 is increased in the period from the time point t6 at which engagement of the reverse clutch 19 is completed to the time point t9 a prescribed time later, the vehicle can be accelerated in the reverse running direction with a smooth action after the forward/reverse running changeover action.

(6) Since the lock-up clutch 33 is disengaged during the forward/reverse running changeover action, gear change shock during the forward/reverse running changeover action can be further reduced by the damping effect produced by the torque converter 3.

(7) Since the engagement action of the lock-up clutch 33 after the forward/reverse running changeover action is performed gradually, changeover can be effected to a driving mode in which there is efficient motive power transmission without accompanying gear change shock.

It should be noted that the speed stage in the description of operation given above is not restricted to being a third-speed stage and any desired speed stage could be selected. Also, the changeover from reverse running to forward running is performed in the same way in accordance with the gist of the description of operation given above, substituting "forward running" for "reverse running" and substituting "reverse running" for "forward running" in the description of operation given above.

Also, although, in this embodiment, an example was illustrated in which, when the vehicle speed is reduced through the first prescribed speed Vb to the second prescribed speed Vd, as shown in (g) of FIG. 3, the braking force of the brake devices 8, 8 is increased in stepwise fashion, it would be possible to increase the braking force of the brake devices 8, 8 continuously from Fb to Fc in accordance with the vehicle speed, by reducing the brake pressure in step-less fashion (i.e. continuously) from Pb to Pc in accordance with vehicle speed in the period from the time point t2 to t4 as shown in (g') of FIG. 3. This has the advantage that the braking action of the brake devices 8, 8 can be performed more smoothly.

The present invention can be utilized as a drive device in for example vehicles used in construction, industrial vehicles and agricultural vehicles.

Having described the embodiments, it will become apparent that various modifications can be made without departing from the scope of the invention as defined in the accompanying claims.

What is claimed is:

1. A drive device for a working vehicle having a transmission comprising a forward running stage that is selected by engagement of a forward clutch and a reverse running stage that is selected by engagement of a reverse clutch, in which a motive power of an engine is transmitted to a drive wheel through the selected forward running stage or reverse running stage, the drive device comprising:
    control means that outputs a reverse running command in accordance with operation of a control unit;
    brake means that decreases a vehicle speed;
    braking force control means that controls a braking force of the brake means; and
    forward/reverse clutch control means that controls respective engagement/disengagement actions of the forward clutch and the reverse clutch, wherein
    if the reverse running command is output from the control means while the vehicle is running forward, the braking force control means controls the braking force of the brake means such that the vehicle speed is diminished through a first prescribed speed to a second prescribed speed and
    the forward/reverse clutch control means disengages the forward clutch,
    when the vehicle speed has reached the first prescribed speed, the reverse clutch is put in a slipping action condition, and
    after the vehicle speed has reached the second prescribed speed, the reverse clutch is gradually engaged.

2. The drive device for a working vehicle according to claim 1, wherein engine control means is provided that controls the engine, the engine control means performing control to temporarily decrease an engine rotational speed prior to commencement of the gradual engagement action of the reverse clutch and to increase the engine rotational speed that is temporarily decreased after completion of engagement of the reverse clutch.

3. The drive device for a working vehicle according to claim 1, wherein the braking force control means performs control so as to increase the braking force of the brake means in stepwise fashion or in accordance wit the vehicle speed.

4. The drive device for a working vehicle according to claim 1, wherein a torque converter comprising a lock-up clutch is interposed in a motive power transmission path between the engine mid the transmission and
    lock-up clutch control means is provided that controls the engagement/disengagement action of the lock-up clutch; and
    the lock-up clutch control means performs control so as to disengage the lock-up clutch in accordance with disengagement of the forward clutch and to gradually engage the lock-up clutch after completion of engagement of the reverse clutch.

5. A drive device for a working vehicle having a transmission comprising a forward running stage that is selected by engagement of a forward clutch and a reverse running stage that is selected by engagement of a reverse clutch, in which a motive power of an engine is transmitted to a drive wheel through the selected forward running stage or reverse running stage, the drive device comprising:
    control means that outputs a forward running command in accordance with operation of a control unit;
    brake means that decreases a vehicle speed;

braking force control means that controls a braking force of the brake means; and forward/reverse clutch control means that controls respective engagement/disengagement actions of the forward clutch and the reverse clutch, wherein if the forward running command is output from the control means while the vehicle is running in reverse, the braking force control means controls the braking force of the brake means such that the vehicle speed is diminished through a first prescribed speed to a second prescribed speed and the forward/reverse clutch control means disengages the reverse clutch, when the vehicle speed has reached the first prescribed speed, the forward clutch is put in a slipping action condition, and after the vehicle speed has reached the second prescribed speed, the forward clutch is gradually engaged.

6. The drive device for a working vehicle according to claim 2, wherein engine control means is provided that controls the engine, the engine control means performing control to temporarily decrease an engine rotational speed prior to commencement of the gradual engagement action of the forward clutch and to increase the engine rotational speed that is temporarily decreased after completion of engagement of the forward clutch.

7. The drive device for a working vehicle according to claim 5, wherein the braking force control means performs control so as to increase the braking force of the brake means in stepwise fashion or in accordance with the vehicle speed.

8. The drive device for a working vehicle according to claim 5, wherein a torque converter comprising a Jock-up clutch is interposed in a motive power transmission path between the engine and the transmission and lock-up clutch control means is provided that controls the engagement/disengagement action of the lock-up clutch; and the lock-up clutch control means performs control so as to disengage the lock-up clutch in accordance with disengagement of the reverse clutch and to gradually engage the lock-up clutch after completion of engagement of the forward clutch.

9. A method of controlling drive of a working vehicle having a transmission comprising a forward running stage that is selected by engagement of a forward clutch and a reverse running stage that is selected by engagement of a reverse clutch, in which a motive power of an engine is transmitted to a drive wheel through the selected forward running stage or reverse running stage, the method comprising the steps of:

if a reverse running command is output while the vehicle is running forward, controlling a braking force of a brake so as to decrease a vehicle speed through a first prescribed speed to a second prescribed speed;

disengaging the forward clutch, putting the reverse clutch in a slipping action condition when the vehicle speed has reached the first prescribed speed; and gradually engaging the reverse clutch after the vehicle speed has reached the second prescribed speed.

10. The method according to claim 9, wherein the controlling of the brake force comprises increasing the braking force of the brake in stepwise fashion or in accordance with the vehicle speed.

11. A drive device for a working vehicle having a transmission comprising a forward running stage that is selected by engagement of a forward clutch and a reverse running stage that is selected by engagement of a reverse clutch, in which a motive power of an engine is transmitted to a drive wheel through the selected forward running stage or reverse running stage, the drive device comprising:

control means that outputs a reverse running command in accordance wit operation of a control unit;

brake means that decreases a vehicle speed;

braking force control means that controls a braking force of the brake means; and forward/reverse clutch control means that controls respective engagement/disengagement actions of the forward clutch and the reverse clutch, wherein if the reverse running command is output from the control means while the vehicle is running forward, the braking force control means controls the braking force of the brake means such that the vehicle speed is diminished through a first prescribed speed to a second prescribed speed and the forward/reverse clutch control means disengages the forward clutch, when the vehicle speed has reached the first prescribed speed, the reverse clutch is put in a slipping action condition where a reverse clutch pressure is extremely small, and after the vehicle speed has reached the second prescribed speed, the reverse clutch is gradually engaged.

12. The drive device for a working vehicle according to claim 11, wherein the braking force control means performs control so as to increase the braking force of the brake means in stepwise fashion or in accordance with the vehicle speed.

13. A method of controlling drive of a working vehicle having a transmission comprising a forward running stage that is selected by engagement of a forward clutch and a reverse running stage that is selected by engagement of a reverse clutch, in which a motive power of an engine is transmitted to a drive wheel through the selected forward running stage or reverse running stage, the method comprising the steps of:

if a forward running command is output while the vehicle is running in reverse, controlling a braking force of a brake so as to decrease a vehicle speed through a first prescribed speed to a second prescribed speed;

disengaging the reverse clutch, putting the forward clutch in a slipping action condition when the vehicle speed has reached the first prescribed speed; and gradually engaging the forward clutch after the vehicle speed has reached the second prescribed speed.

14. The method according to claim 13, wherein the controlling of the brake force comprises increasing the braking force of the brake in stepwise fashion or in accordance with the vehicle speed.

* * * * *